United States Patent [19]

Lampl et al.

[11] 4,027,793

[45] June 7, 1977

[54] SCRAPER CHAIN CONVEYOR

[75] Inventors: Friedrich Lampl, Cheltenham; Thomas Campbell Paul, Worcester, both of England

[73] Assignee: Dowty Meco Limited, Worcester, England

[22] Filed: May 7, 1974

[21] Appl. No.: 467,811

[30] Foreign Application Priority Data

May 7, 1973 United Kingdom ............. 21536/73

[52] U.S. Cl. ............................ 198/719; 198/731
[51] Int. Cl.² .................................... B65G 19/00
[58] Field of Search .......... 198/189, 109, 194, 204, 198/168, 227, 171, 172, 175, 719, 731; 59/93, 91; 74/256, 245

[56] References Cited

UNITED STATES PATENTS

| | | | |
|---|---|---|---|
| 1,790,297 | 1/1931 | Alger | 198/189 X |
| 2,201,665 | 5/1940 | Hogander | 198/189 |
| 2,509,529 | 5/1950 | Roblee | 198/175 X |
| 3,484,927 | 12/1969 | Smerd et al. | 59/93 X |
| 3,566,603 | 3/1971 | Chadwick | 59/78.1 |
| 3,744,618 | 7/1973 | Monne et al. | 198/168 X |
| 3,772,875 | 11/1973 | Viano | 198/189 |

FOREIGN PATENTS OR APPLICATIONS

| | | | |
|---|---|---|---|
| 1,490,937 | 8/1966 | France | 198/204 |
| 1,045,900 | 12/1958 | Germany | 198/189 |
| 948,316 | 8/1956 | Germany | 198/175 |
| 1,180,678 | 10/1964 | Germany | 198/229 |
| 1,109,090 | 4/1968 | United Kingdom | 198/204 |
| 820,304 | 9/1959 | United Kingdom | 198/189 |
| 174,109 | 9/1965 | U.S.S.R. | 198/168 |

Primary Examiner—Robert J. Spar
Assistant Examiner—James M. Slattery
Attorney, Agent, or Firm—Young & Thompson

[57] ABSTRACT

The invention concerns a scraper chain conveyor in which one or more endless chains drive a plurality of spaced scrapers along a conveying channel to convey loose material such as excavated rock. The invention comprises the provision on the or each chain of one or more wear pads at positions spaced from the scrapers to spread over a substantial area the wear due to the chain under tension bearing on parts of the conveyor channel having bends or irregularities.

1 Claim, 8 Drawing Figures

SCRAPER CHAIN CONVEYOR

This invention relates to a scraper chain conveyor in which one or more endless chains drive a plurality of spaced scrapers along a conveying channel to convey loose material such as excavated rock or like mineral. The channel may be of considerable length and may include bends or irregularities. The chain or chains driving the scrapers work under considerable tension and each piece of chain between each adjacent pair of scrapers will tend to be straight and will bear on parts of the channel having bends or irregularities. A groove will be cut by each chain into these bends or irregularities which will weaken the conveyor structure.

In accordance with the present invention a chain for use in a scraper conveyor includes a plurality of wear pads secured to the chain at spaced positions along its length separated from the scraper positions, such wear pads providing wear surfaces in addition to the chain link surfaces for engagement with the conveyor channel of the conveyor.

Further, in accordance with the present invention, a chain conveyor comprises a plurality of conveyor pans secured in end to end relation so as to provide for slight relative movement between each adjacent pair of pans, the pans providing at least one conveyor channel, one or more chains drivable lengthwise along the conveyor channel, a plurality of scrapers mounted at spaced intervals along the chain to engage the conveyor channel to propel loose material along the channel and one or more wear pads secured to the chain between one or more adjacent pairs of scrapers, each wear pad providing a wear surface for engagement with the conveyor channel.

Each wear pad may provide at least one wear surface having a dimension transverse to the length of the chain substantially greater than the thickness of the wire from which each link is formed.

The links may all be of similar oval shape.

Each wear pad may be formed in two parts securable together to engage loosely over the sides of an oval link.

Two embodiments of the invention will now be described with reference to the accompanying drawings, in which.

Figure 1:
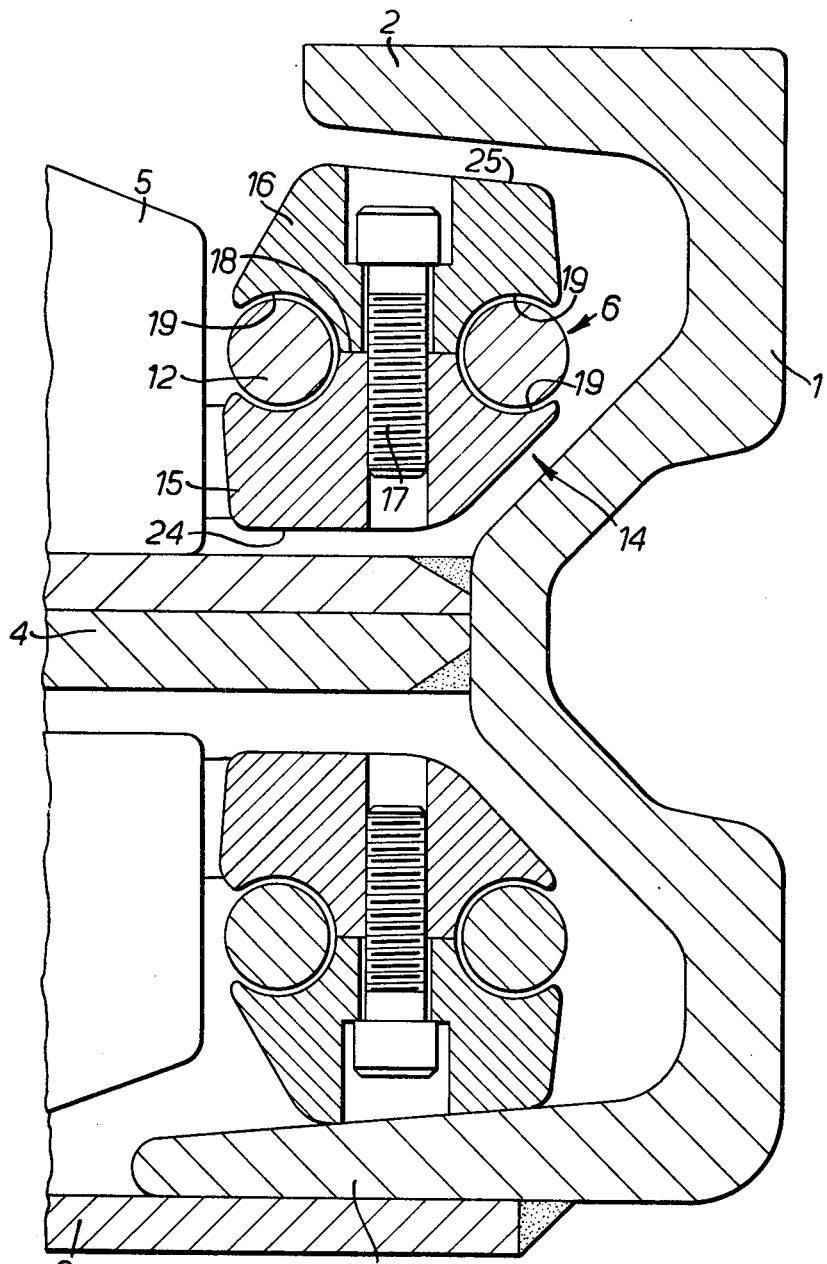
FIG. 1 is a partial cross-section through scraper chain conveyor channel.

Referring initially to FIG. 1, the drawing shows a cross-section through one side 1 of a conveyor channel, this side being of the well-known sigma cross-section. This side includes upper and lower flanges 2 and 3 and a central deck 4, the latter extending between two similar sides of sigma section. The conveying channel is formed by the upper part of the side 1, the deck 4 and the upper part of a similar side. Within this conveying channel, a plurality of scrapers 5 are located at spaced intervals, each being adapted to scrape over a substantial width of the deck 4. The scrapers 5 are driven in a conventional way be means of a pair of chains 6 arranged one adjacent to each of the side members. Only one of these chains can be shown in FIG. 1. The underside of the deck 4 comprises a return channel for the chain and scrapers which normally is not intended for conveying purposes. Material to be conveyed is fed into the upper part of the conveyor channel between the flanges 2 of the side members and such material falls on the deck 4 and is engaged by the scrapers 5 for movement along the channel.

It is conventional that the conveying channel should be formed in a number of short lengths, referred to as pans, which are arranged in end to end relation. A pair of such pans are indicated at 7 and 8 in FIG. 3. The pans are intended to rest on the rough mine floor by means of floor plates 9 secured across the underside of the flanges 3. Since the floor is rough it is inevitable that the pans cannot be directly aligned with one another and in FIG. 3 it will be noticed that the two pans are slightly inclined to one another.

Figure 3:
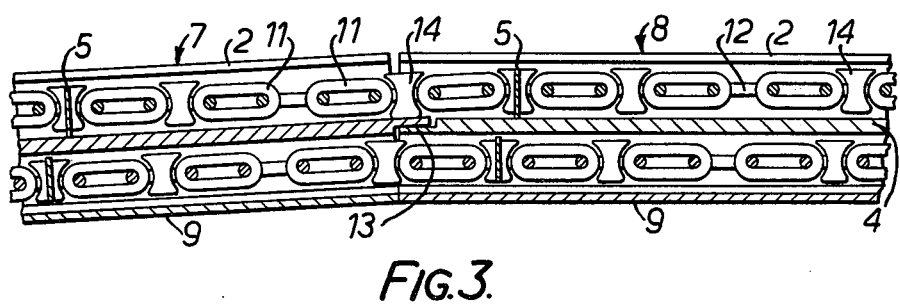
FIG. 3 is a diagrammatic longitudinal cross-section through part of a conveyor including a bend.
Figure 4:
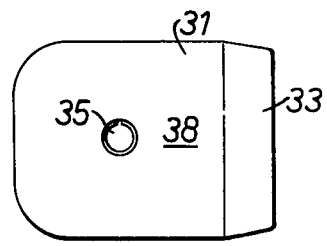
FIGS. 4, 5, 6 and 7 are views from four directions of an alternative wear pad.
Figure 5:
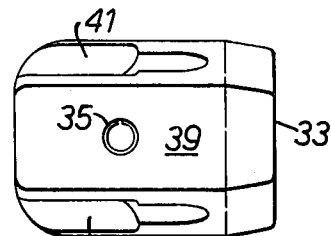
Figure 6:
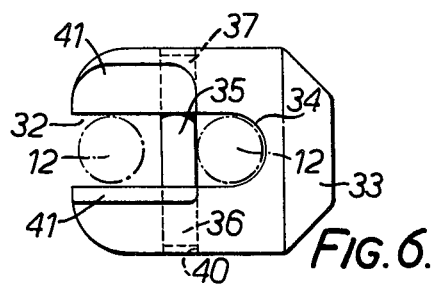
Figure 8:
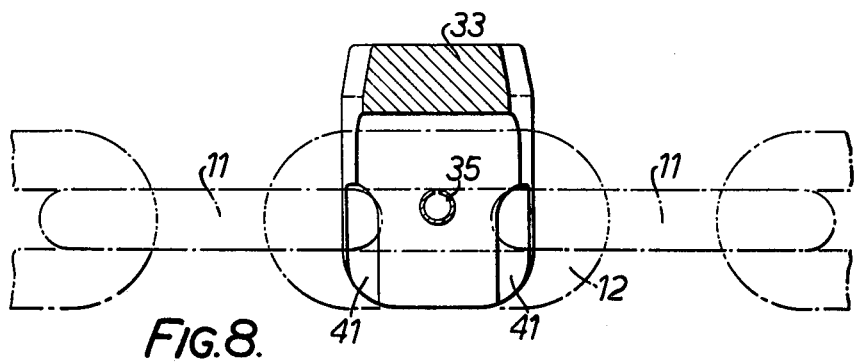
FIG. 8 is a cross-section on the line VIII—VIII of FIG. 7.
Figure 7:
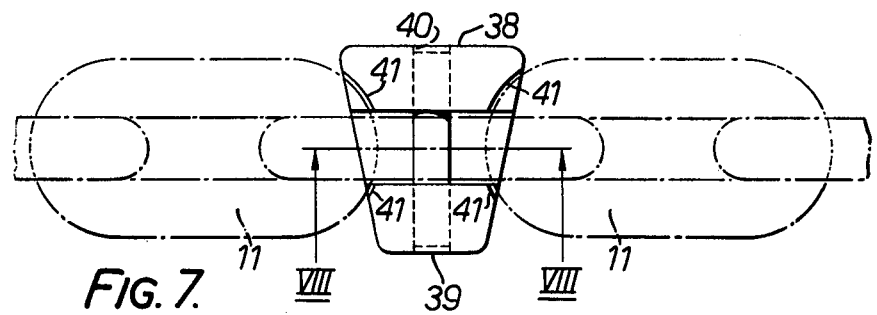

Each chain is comprised by a plurality of similar oval links formed of circular section steel wire, such links inter-engaging with one another so that the links are alternately in the horizontal and vertical planes. In FIG. 3 the vertical links are indicated at 11 and the horizontal links at 12. The scrapers 5 are normally spaced about one for every eight links of chain thus providing that in between each adjacent pair of scrapers there are two lengths of chain each comprising about eight links. Where the adjacent conveyor pans 7 and 8 are slightly inclined as shown in FIG. 3, the joint 13 between the deck plates 4 presents an irregularity in the conveying channel and where a pair of scrapers 5 reach positions equally spaced on either side of the joint 13, the center part of each intervening length of chain can easily engage on the joint 13 and normally would quickly wear a groove in the joint. In FIG. 3 it will be seen that in each length of chain between the two adjacent scrapers 5, two wear pads 14 are secured and it will further be clear that at positions where scrapers are spaced on either side of the joint 13, the surfaces 24 of the wear pads 14 will then successively engage the joint 13 rather than the chain links. Similarly the opposite surfaces 25 of the pads 14 could engage joints in the conveyor pans where the inclination between the pans is opposite to that shown in FIG. 3. The wear surfaces 24 and 25 each have a dimension transverse to the chain length considerably greater than the thickness of the wire forming each chain link and therefore any wear is spread over a larger area.

Preferably the wear surface projects slightly from the width of the links.

The structure of each wear pad 14 is shown in more detail in FIG. 1. The pad 14 is made in two parts 15 and 16 intended to be clamped together by a clamping screw 17 with a pair of surfaces 18 in abutting contact. Each of the parts 15 and 16 is formed with a pair of parallel grooves 19 adjacent to its surface 18 such that when the parts are clamped together the grooves 19 engage loosely on parallel sides of the link 12. A pad 14 is shown in longitudinal section in FIG. 2 from which it is clear that each of the parts 15 and 16 include concave end surfaces 21 to accommodate the ends of the adjacent vertical links 11.

Figure 2:
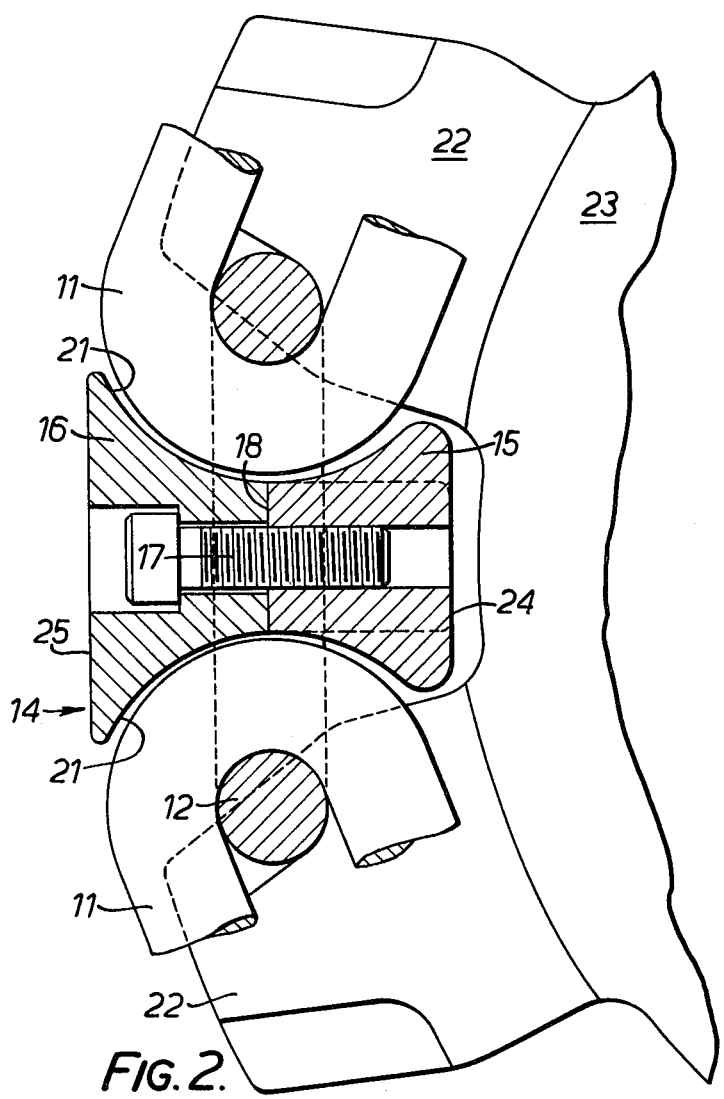
FIG. 2 is a partial cross-section through a drive sprocket showing how a chain with a wear pad may engage the drive sprocket.

Also it will be apparent from FIG. 2 that the pads 14 are so shaped that each will fit between two adjacent teeth 22 of the driving sprocket 23 associated with the chain conveyor. The wear surfce 24 of each pad wil fit near to the roots of the driving teeth 22. Conventional driving sprocket construction normally provides sufficient clearance between the roots of adjacent teeth to accommodate surfaces 24 having substantial bearing area.

In the lower return path for the conveyor chains and scrapers through the conveyor pans, the tension in the chain may be very much lower and the engagement of the chain on the projections may create much less wear. Nevertheless, the outer surfaces 24 and 25 of each of the pad parts 16 may make contact with the projections within the conveyor pans rather than the links themselves thus spreading wear on the pans over a large area.

Reference is now made to an alternative form of wear pad illustrated in FIGS. 4 to 8 of the accompanying drawings. This wear pad may be substituted for the pad 14 of FIGS. 1 to 3. The illustrated wear pad 31 is of one piece construction having a slot 32 extending partially through the wear pad, the slot being of such dimensions as to accommodate the two sides of a horizontal link 12 as shown in dotted lines. The slot 32 is terminated at a base portion 33, the bottom of the slot 32 being of circular shape 34. The wear pad is secured on to the chain link by means of a spring pin 35 engaged in a transverse hole 40 in the wear pad. The pin 35 is a slotted tube of spring metal such as steel. The location of the pin 35 is such that the available space between the pin and the circular bottom 34 of the slot is just sufficient to accommodate the circular cross-section wire forming one side of the link 12.

One face 38 of the wear pad is intended to be outermost in use so as to take the outer position when the chain moves around the drive sprocket. The opposite surface 39 (see FIG. 4) is intended to be innermost in use so as to fit in between the roots of adjacent driving teeth when the chain passes around a driving sprocket. In order to accommodate the rounded ends of the adjacent vertical links 11 the sides of the slots include circular cut-away portions 41.

When such a wear pad is fitted to conveyor as shown in FIG. 1, the base 33 is directed inwardly towards the other chain. The wear pad could take other positions depending on the availble space in the conveyor pans.

The spacing between the upper and lower surfaces 38 and 39 is slightly greater than the width of a chain link so that the surfaces 38 and 39 project slightly beyond the width of the links 11 when the chain is in conveyor channel. The dimension of each of the surfaces 38 and 39 transverse to the length of the chain will be seen to be considerably greater than the diameter of the wire from which the chain links are made thereby the area of contact between the wear pads and any projecting part of the conveyor channel such as the joint 13 in FIG. 3 will be spread over a large area. It will be seen that the wear pad is located on a link 12 with very little possibility of lateral or side movement on the link, lateral movement being prevented by the engagement of one side of the link 12 between the bolt 35 and the bottom 34 of the groove and secondly by the circular ends of the adjoining link 11 engaging within the grooves 41 at the side of the wear pad.

In the two described embodiments, two wear pads are intended to be fitted to a chain in between each adjacent pair of scrapers, but it is within the scope of the present invention to provide one or more pads in a length of chain between adjacent scrapers. The length of chain between each adjacent pair of scrapers may be any convenient number of links.

The wear pads 14 or 31 in either of the two described embodiments are intended for attachment to horizontal chain links but it will be appreciated that within the scope of the present invention, the pads could be attached to vertical links 11, although of course the structure of such pads would need to be appropriate to fit both within the conveyor channels and within the teeth of the driving sprocket.

In both of the wear pads 14 and 31 upper and lower wear surfaces are provided which project slightly beyond the width of the links of a conveyor chain in its horizontal operative position. Within the broad scope of the present invention, such wear surfaces need not project beyond the width of the vertial links but could be slightly within the width of the vertical links. At a position of wear such as the joint 13 in the conveyor, a slight grooving of the joint 13 would occur as a result of the movement of the projecting parts of the vertical links but beyond a certain small degree of wear, the wear pad surfaces would engage the joint 13 and provide a very much larger wear surface, thus preventing an excessively deep groove being formed.

Whilst in the described embodiments, emphasis has been placed on the ability of the wear pads to provide upper and lower wear surfaces, it will be appreciated that these pads may also provide wear sufaces for engagement with the outer surfaces of the conveyor channel.

It is also within the broad scope of the present invention for the dimension of a wear surface transverse to the direction of chain movement to be somewhat narrower than the wire diameter of the chain links. Advantage will be gained provided that such a wear surface is shaped to make surface to surface engagement with projections in the conveyor channel.

We claim:

1. A scraper chain conveyor comprising a plurality of conveyor pans secured together in end-to-end relation to provide slight relative misalignment between each adjacent pair of pans, the pans together defining a conveyor channel, at least one chain movable lengthwise of the channel, the chain comprising a plurality of similar interconnected oval links giving universal flexing capability between each adjacent pair of links, a plurality of scrapers mounted at spaced intervals along the chain to engage the conveyor channel over a substantial part of its width to propel loose material along the channel, a plurality of wear pads secured to each chain at links spaced from the scraper positions, each wear pad having a flat wear surface capable of engaging the channel whose dimension transverse to the direction of chain movement is within a range from slightly less than the width of the wire of the links to slightly greater than the width of the link, and whose dimension in the direction of chain movement is substantially greater than the space between the curved ends of two links which connect with the link carrying the wear pad, a pair of recesses being provided in the pad to accommodate the said curved ends, the wear surfaces of said pads between adjacent pairs of scrapers being spaced above said channel when the associated said pair of scrapers is supported on said channel.

* * * * *